United States Patent
Murasaki et al.

[11] Patent Number: 5,961,891
[45] Date of Patent: Oct. 5, 1999

[54] METHOD FOR PREPARING COLORING LAYER COMPOSITION FOR CHROMATIC DEVICE

[75] Inventors: Takanori Murasaki; Takashi Komori; Toshiki Inoue; Yoshifumi Kato, all of Aichi-ken, Japan

[73] Assignee: Kabushiki Kaisha Toyoda Jidoshokki Seisakusho, Kariya, Japan

[21] Appl. No.: 09/122,357

[22] Filed: Jul. 24, 1998

[30] Foreign Application Priority Data

Jul. 24, 1997 [JP] Japan .................................. 9-198798

[51] Int. Cl.$^6$ ................................ F21V 9/08; G02F 1/15
[52] U.S. Cl. ......................... 252/582; 252/583; 252/586; 252/301.5; 359/270; 359/273; 423/606; 427/126.3; 428/472
[58] Field of Search .................. 423/606, 62; 427/126.3; 252/586, 301.5, 186.41, 583, 582; 428/469, 472; 359/265, 270, 273

[56] References Cited

U.S. PATENT DOCUMENTS

| | | | |
|---|---|---|---|
| 5,252,354 | 10/1993 | Cronin et al. | 427/58 |
| 5,352,504 | 10/1994 | Boulanger et al. | 428/216 |
| 5,404,244 | 4/1995 | Van Dine et al. | 359/270 |
| 5,442,478 | 8/1995 | Lampert et al. | 359/273 |
| 5,457,218 | 10/1995 | Cronin et al. | 556/44 |
| 5,525,264 | 6/1996 | Cronin et al. | 252/583 |
| 5,851,439 | 12/1998 | Inoue et al. | 252/586 |

*Primary Examiner*—Shean C. Wu
*Attorney, Agent, or Firm*—Morgan & Finnegan, L.L.P.

[57] ABSTRACT

The present invention relates to a method for preparing a coloring layer composition for a chromatic device comprising a step of preparing a peroxotungstic acid solution comprising a solute including $WO_3 \bullet aNb_2O_5 \bullet bH_2O_2 \bullet cH_2O$ (a, b, and c represent a positive number), water for dispersing and holding the solute, and an organic solvent compatible with water, and aging the peroxotungstic acid solution to obtain a polymer. According to the method of the present invention, a large size chromatic device can be reliably produced at a low cost. Further, a composition having a sufficient coloring effect and a quick response speed of the coloration-bleaching change in the chromatic device can be prepared.

6 Claims, 10 Drawing Sheets

METHOD FOR PREPARING COLORING LAYER COMPOSITION FOR CHROMATIC DEVICE

BACKGROUND OF THE INVENTION

1. Field of the Invention

The present invention relates to a method for preparing a coloring layer composition for a chromatic device. A composition obtained by the method can be used in a coloring layer forming process for forming, for example, a reduction coloring layer of an electrochromatic (EC) device.

A known chromatic device, an EC device, for example, comprising a first transparent electrode layer 2, a reduction coloring layer 3, an electrolyte layer 4, an oxidation coloring layer 5, a second transparent electrode layer 6 and a second transparent substrate 7 successively laminated on a first transparent substrate 1 in show in FIG. 1. By applying a current of a predetermined threshold value or more between the first electrode layer 2 and the second electrode layer 6 in the EC device, a redox reaction takes place in the vicinities of the interfaces between the first and second electrode layers 2, 6 and the oxidation coloring layer 5 so as to obtain a reversible coloration-bleaching change.

The present inventors have proposed a coloring layer composition allowing reliable low cost production of such a large size chromatic device (U.S. Pat. No. 5,851,439). The composition is a peroxotungstic acid comprising a solute including $WO_3 \bullet aNb_2O_5 \bullet bH_2O_2 \bullet cH_2O$ (a, b, and c represent 0 or a positive number), water for dispersing and holding the solute, and an organic solvent compatible with water.

Although bubbles are liable to be generated in the composition due to hydrogen peroxide contained in the peroxotungstic acid, the organic solvent compatible with water can control the generation of oxygen, caused by the decomposition reaction of the hydrogen peroxide, and the discharge of dissolved oxygen. Therefore, unevenness or peel-off of the coloring layer can be effectively prevented. Further, the organic solvent can be evaporated by heat treatment of the coat film without hindering the dissolution of the solute in the water. Accordingly, when the composition is employed, the practicality of a wet method, such as a dip coating method, is increased and a large size chromatic device can be reliably produced at a low cost.

However, according to the test results of the present inventors, it was learned that if a reduction coloring layer of an EC device is formed immediately after the preparation of the peroxotungstic acid, a sufficient coloring effect cannot be obtained with the EC device and further, the response speed of the coloration-bleaching change becomes slow.

Such a problem is observed not only in the EC device but also in other chromatic elements including a thermochromatic device, a photochromatic device, and the like.

In light of with the above-mentioned conventional situation, an object of the present invention is to provide a method for preparing a composition capable of reliably producing a large size chromatic device securely at a low cost, wherein the chromatic device has a sufficient coloring effect and a quick response speed of the coloration-bleaching change.

SUMMARY OF THE INVENTION

The present invention is a method for preparing a coloring layer composition for a chromatic device comprising a step of preparing a peroxotungstic acid solution comprising a solute including $WO_3 \bullet aNb_2O_5 \bullet bH_2O_2 \bullet cH_2O$ (a, b, and c represent 0 or a positive number), water for dispersing and holding the solute, and an organic solvent compatible with water, and aging the peroxotungstic acid solution to obtain a polymer.

Further, according to the present invention, the peroxotungstic acid solution is prepared by the steps comprising:

a first step of obtaining a first solution by dissolving W powders and NbC powders in $H_2O_2$;

a second step of obtaining a second solution by separating C from the first solution;

a third step of obtaining a third solution containing $WO_3 \bullet aNb_2O_5 \bullet bH_2O_2 \bullet cH_2O$ (a, b, and c represent a positive number) by decomposing excessive $H_2O_2$ and evaporating excessive water from the second solution; and a fourth step of adding an organic solvent to the third solution.

DESCRIPTION OF THE EMBODIMENT

Figure 2:
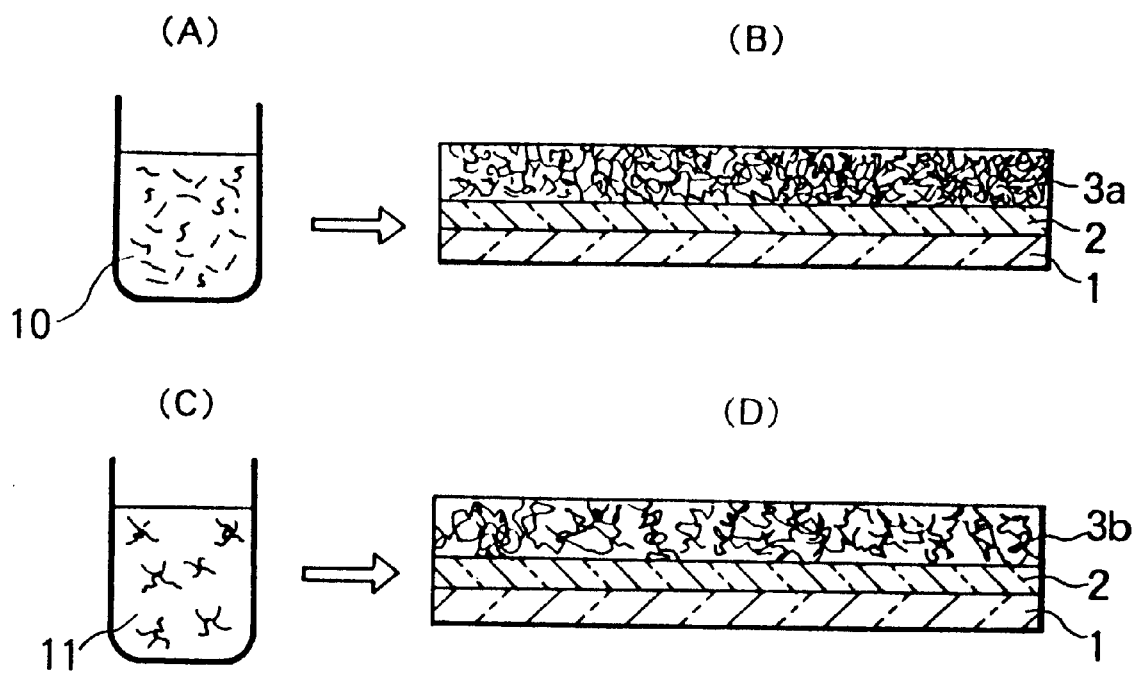
FIG. 2A is a schematic diagram of a peroxotungstic acid solution without polymerization.
FIG. 2B is a cross-sectional view of a reduction coloring layer etc. thereof.
FIG. 2C is a schematic diagram of a peroxotungstic acid solution after polymerization.
FIG. 2D is a cross-sectional view of a reduction coloring layer etc. thereof.

In order to solve the above-mentioned problems, the present inventors extensively studied EC devices. As a result, as shown in FIG. 2A, a peroxotungstic acid solution 10, after preparation, has small molecules since it is not polymerized. It was found that if a reduction coloring layer 3a is immediately formed on a first transparent electrode layer 2 of a first transparent substrate 1 with the peroxotungstic acid solution 10 as shown in FIG. 2B, the reduction coloring layer 3a becomes packed. It was revealed that since ions having a comparatively large radius such as Na ions and K ions can have difficulty entering or exiting from the packed reduction coloring layer 3a, a sufficient coloring effect cannot be achieved. It was further revealed that since ions diffuse slowly in the packed reduction coloring layer 3a, the response speed of the coloration-bleaching change becomes slow. It was also found that polymerization of the peroxotungstic acid solution by aging is effective in preparing the reduction coloring layer 3a from becoming packed, which led to the present invention.

That is, in a method of the present invention, a peroxotungstic acid solution is aged to prepare a polymer 11, having large molecules due to the polymerization, as shown in FIG. 2C. A sufficient coloring effect can be achieved by forming a reduction coloring layer 3a on a first transparent electrode layer 2 of a first transparent substrate 1 with the polymer 11 as shown in FIG. 2D, because ions having a comparatively large radius such as Na ions and K ions can easily enter or exit. Further, since ions can diffuse rapidly in such a coarse reduction coloring layer 3a, the response speed of the coloration-bleaching change becomes faster.

It is believed that these effects are achieved not only in EC devices, but also in other chromatic devices including thermochromatic devices, photochromatic devices, and the like.

Examples of organic solvents compatible with water include alcohols such as alcohols having $C_1$ to $C_6$ carbon atoms including methanol, ethanol, and propanol, and ethoxyethanol.

The aging of the peroxotungstic acid solution can be conducted by, for example, heat treatment at a fixed temperature of about 20 to 80° C., preferably about 40 to 60° C. The aging time depends on the compound used and the amount to be used, but in general is from several minutes to about 700 hours, preferably from several minutes to about 130 hours. When an Nb compound is used, the polymerization proceeds instantaneously or several minutes according to the amount used.

The amount of water and the organic solvent used to prepare the peroxotungstic acid solute can be selected optionally, but in general the ratio of the solute : water : organic solvent is, 1 : about 0.1 to 5 : about 0.4 to 20.

In a method for preparing a coloring layer composition for a chromatic device of the present invention, a peroxotungstic acid solution can be prepared in a method including the following steps: that is, a first step of obtaining a first solution by dissolving W powders and NbC powders in $H_2O_2$;

a second step of obtaining a second solution by separating C from the first solution;

a third step of obtaining a third solution containing $WO_3 \bullet aNb_2O_5 \bullet bH_2O_2 \bullet cH_2O$ (a, b, and c represent a positive number) by decomposing excessive $H_2O_2$ and evaporating excessive water from the second solution; and a fourth step of adding an organic solvent to the third solution.

Figure 3:
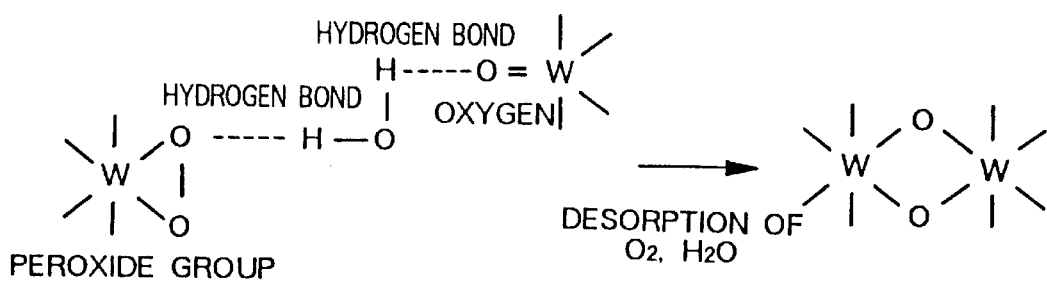
FIG. 3 is a chart showing the polymerization process of a peroxotungstic acid solution.

According to "J. Solid State Chem., 90, 47 (1991)" by T. Kudo et al., a peroxotungstic acid solution is polymerized by the separation and the desorption of a peroxide group of a polyanion $[W_6O_{19}]^{n-}$ having a Lindqvist type structure, a hydrated proton, and end oxygen (W=O) as shown in FIG. 3. The bond distance of W=O is 1.69 Å, whereas the bond distance of Nb=O is 1.73 to 1.76 Å. Therefore, by adding Nb, which has a longer bond distance with an oxygen atom than with W, it is believed that the reactivity of the end oxygen is be improved so as to facilitate the polymerization of the peroxotungstic acid solution.

The method of the present invention has been invented based on the following considerations. Since NbC powders are added in the first solution, the aging of the peroxotungstic acid solution can be easily controlled by the Nb amount to be contained. Thereby, the pot life of the peroxotungstic acid solution can be controlled. Since C of NbC is separated in the second step and thus does not remain in the peroxotungstic acid solution, it does not influence the coloring layer.

According to the test results of the present inventors, with a small polymerization degree, the effect of the present invention cannot be expected. On the other hand, with too large a polymerization degree, the polymer is gelatinized so that the film formation is hindered.

EXAMPLES

Figure 1:
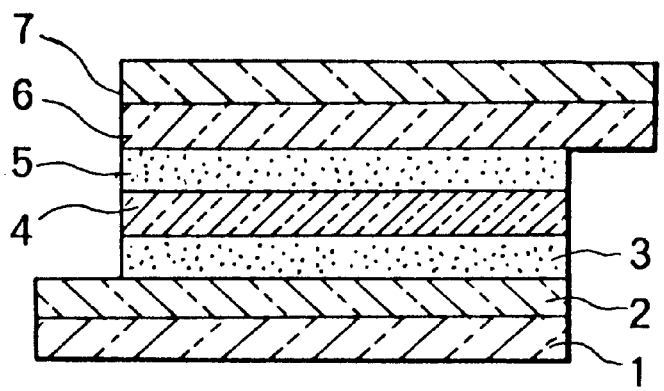
FIG. 1 is a schematic cross-sectional view of an EC device.

An EC device was produced as a chromatic device using an example of reduction coloring layer composition of an example with reference to the EC device shown in FIG. 1. Since the EC device is characterized in the reduction coloring layer composition and thus the appearance is the same as that of the conventional example, the configuration will be explained using the same numerals as in FIG. 1.

(Preparation of a reduction coloring layer composition)

a) Preparation of an peroxotungstic acid solution

[First step]

33.09 g of W powders and 1.55 g of NbC powders were dissolved in 150 ml of 15% $H_2O_2$. 30 ml of 30% $H_2O_2$ was added to the solution to facilitate the dissolving reaction. Further, 30 ml of 30% $H_2O_2$ was added to the solution to facilitate the dissolving reaction. The solution was let to stand for 24 hours in order to completely dissolve unreacted Nbc. Accordingly, a first solution was obtained.

[Second step]

A second solution, with C separated from the first solution, was obtained by letting the first solution stand to precipitate C.

[Third step]

Excessive $H_2O_2$ was decomposed from the second solution over 4 hours by using a platinum mesh, and further, separated by filtrating through fine powders of platinum. Then, excessive water was evaporated by an evaporator so that the solution was condensed until the entire amount became 68 g. Accordingly, a third solution comprising $WO_3 \bullet aNb_2O_5 \bullet bH_2O_2 \bullet cH_2O$ (a, b, and c represent 0 or a positive number, hereinafter referred to as IPA.) and water was obtained.

[Fourth step]

A peroxotungstic acid solution with 24 parts by weight of water and 230 parts by weight of n-propanol with respect to 100 parts by weight of IPA as the solute was obtained by adding n-propanol to the third solution.

b) Aging step of the peroxotungstic acid solution

The peroxotungstic acid solution was aged by heating to a predetermined temperature and letting it stand for a predetermined time so as to obtain a reduction coloring layer composition (polymer).

(Production of an EC device)

An EC device was produced by the following method.

A PET transparent resin film (5 cm×5 cm) was used as first and second transparent substrates 1, 7. ITO (indium tin oxide ($In_2O_3 \bullet SnO_2$)) was deposited on the surface of the first and second transparent substrates 1, 7 so as to form first and second electrode layers 2, 6, whereby a plurality of first ITO films were obtained by the first transparent substrate 1 and the first electrode layer 2, and a plurality of second ITO films were obtained by the second transparent substrate 7 and the second electrode layer 6.

The first ITO films were soaked in the above-mentioned polymer and vertically pulled up at a 0 to 10 cm/min pulling-up speed, whereby a film was formed by the dip coating method. Thereafter, water content was eliminated from the film by applying a heat treatment to the first ITO films with the film formed thereon at 120° C. for 1 hour so that a reduction coloring layer 3 comprising $WO_3 \bullet 0.041 Nb_2O_5$ was formed on the first electrode layer 2.

With the first ITO films soaked in an $LiCF_3SO_3 \bullet$ propylene carbonate (PC) solution, Li ions were injected into the $WO_3 \bullet 0.041 Nb_2O_5$. On the other hand, a Prussian blue ($Fe_4^{2+}[Fe(II)(CN)_6]_3$) film was precipitated on the second electrode layer 6 of the second ITO films washed with alkali by an electrolytic synthetic method so as to form an oxidation coloring layer 5.

Further, an electrolyte solution was prepared by dissolving a supporting salt ($LiCF_3SO_4$) and a photopolymerization initiator (2,2-dimethoxy-2-phenylacetophenone) in polyethylene oxide (PEO) so as to be coated on the oxidation coloring layer 5 on the second ITO films.

The reduction coloring layer 3 on the first ITO films and the electrolyte solution on the second ITO films were bonded. The electrolyte solution was cured by irradiating an ultraviolet ray (UV) thereon so as to form an electrolyte layer 4 with the electrolyte solution, whereby the EC device was obtained.

(Test 1)

A test was conducted to determine a preferable aging condition of a peroxotungstic acid solution.

First, as shown in Table 1, 4 kinds of test compositions 1 to 4 comprising a peroxotungstic acid with different NbC powder amounts and n-propanol amounts were obtained.

TABLE 1

|  | Nb molar content -ration (mol %) | third solution: n-propanol |
| --- | --- | --- |
| test composition 1 | 0 | 1:1.69 |
| test composition 2 | 7.5 | 1:1.69 |
| test composition 3 | 30 | 1:1.58 |
| test composition 4 | 50 | 1:0.62 |

The aging conditions were set for each of the test compositions 1 to 4 in terms of temperature (°C) and aging time (hour) as shown in Table 2.

TABLE 2

|  | 20° C. | 40° C. | 60° C. | 80° C. |
| --- | --- | --- | --- | --- |
| test composition 1 | — | 2–130 hrs | 1–13 hrs | 0.2–2 hrs |
| test composition 2 | 500–700 hrs | 6–20 | 1–7 | 0.2–0.9 |
| test composition 3 | 0–400 | 0–32 | 0–3 | 0–0.5 |
| test composition 4 | 0–50 | 0–1 | 0–0.5 | 0–0.2 |

The relationship between the aging condition and the Coulomb amount of the reduction coloring layer ($mC/Cm^2$) was sought for each of the test compositions 1 to 4.

Figure 4:
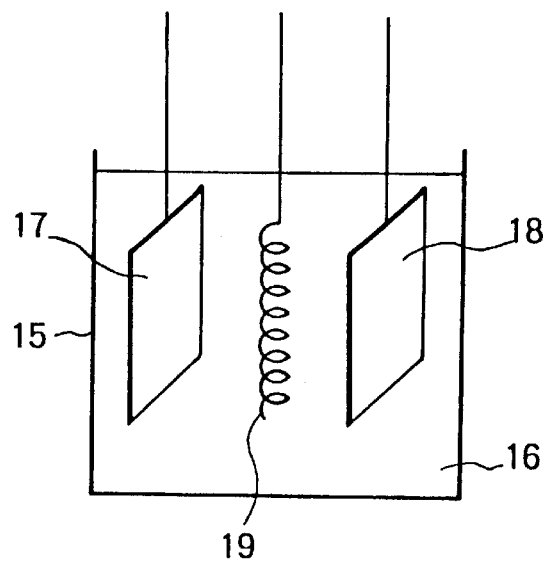
FIG. 4 is a schematic diagram showing the method of measuring the Coulomb amount.
Figure 5:
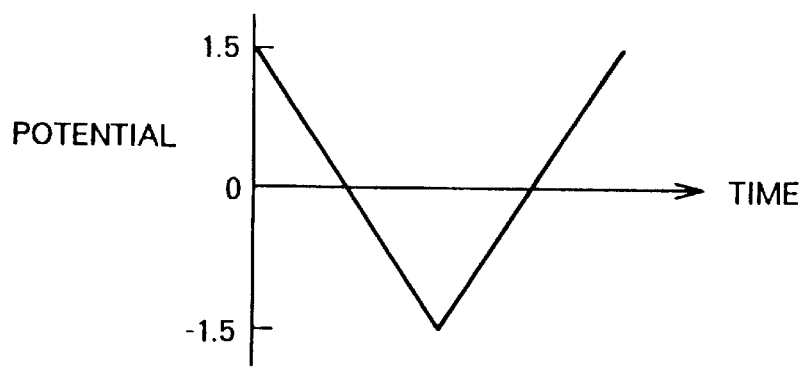
FIG. 5 is a graph showing the relationship between time and the potential according to the method of measuring the Coulomb amount.

Here the Coulomb amount was measured by the CV (cyclic vontanmetry) method mentioned below. That is, ITO was evaporated on a transparent glass plate, and a 0.3 $\mu m$ thickness reduction coloring layer was formed on the ITO for each of the test compositions 1 to 4 as in the above-mentioned example so as to make test pieces. As shown in FIG. 4, an electrolyte liquid 16 containing $NaCF_3SO_3 \bullet$ propylene carbonate (PC) solution and 1% by weight of water was placed in a beaker 15. Each test piece 11 was disposed at the working electrode in the electrolyte liquid, a platinum electrode 18 was disposed at the opposite electrode, and an Ag line 19 was disposed at the reference electrode. Then, ±1.5 V potential was applied to the reference electrode at a 50 mV/second application rate as shown in FIG. 5. The Na ion amount injected into each of the reduction coloring layers is defined as the Coulomb amount (reduction current amount).

Figure 6:
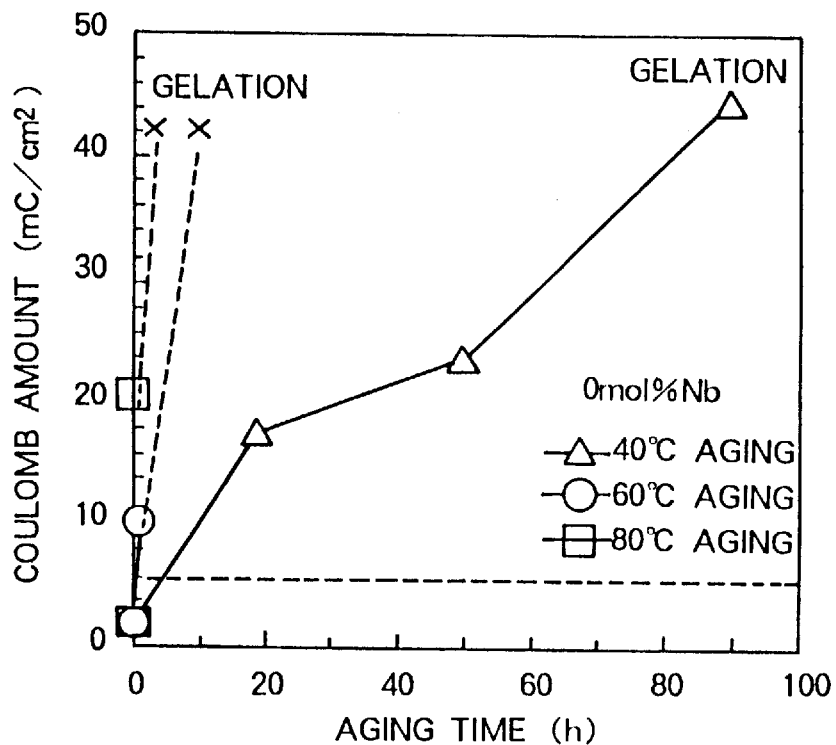
FIG. 6 is a graph showing the relationship between the aging time and the Coulomb amount in the test composition 1.

Results of the test composition 1 are as shown in Table 3 and FIG. 6.

TABLE 3

| Aging time | 20° C. | 40° C. | 60° C. | 80° C. |
| --- | --- | --- | --- | --- |
| 0 | 1.9 | 1.9 | 1.9 | 1.9 |
| 0.5 | — | — | — | 20.9 |
| 1 | — | — | 10.2 | — |
| 19 | — | 17.9 | — | — |
| 50 | — | 23.9 | — | — |
| 90 | — | 44.8 | — | — |

Figure 7:
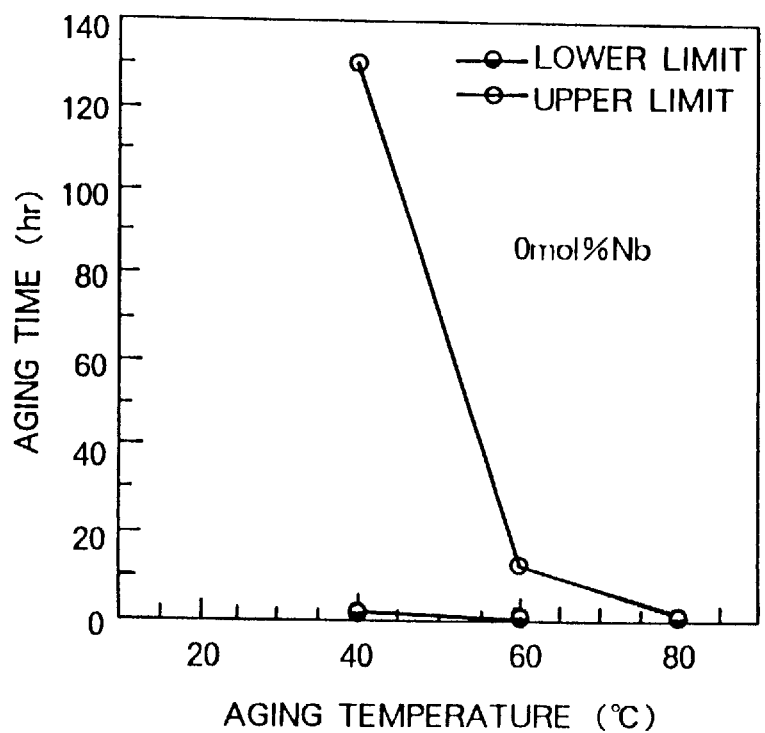
FIG. 7 is a graph showing the relationship between the aging temperature and aging time in the test composition 1.

FIG. 7 can be obtained by seeking the upper limit and the lower limit of the aging condition for the test composition 1 from Table 3 and FIG. 6.

Figure 8:
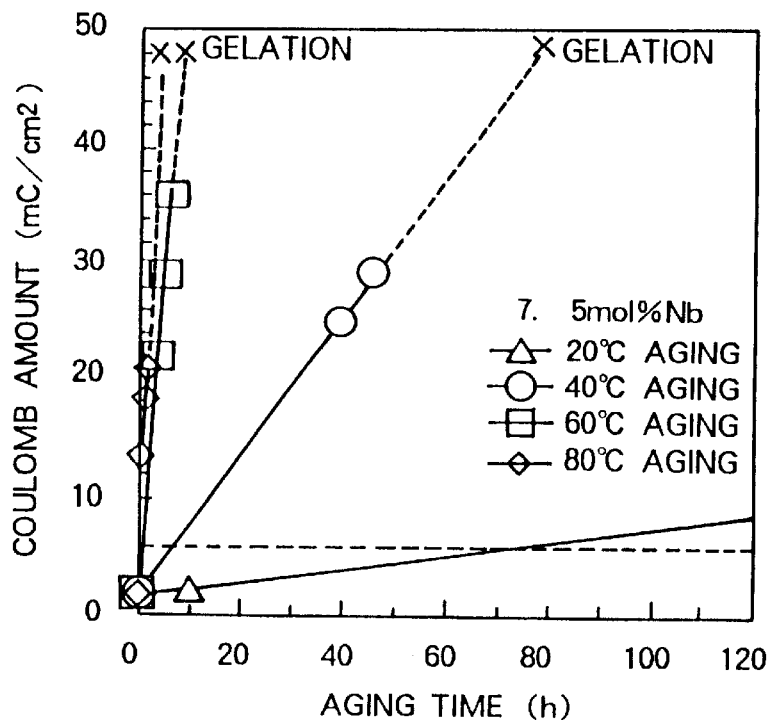
FIG. 8 is a graph showing the relationship between the aging time and the Coulomb amount in the test composition 2.

Results of the test composition 2 are shown in Table 4 and FIG. 8.

TABLE 4

| Aging time | 20° C. | 40° C. | 60° C. | 80° C. |
| --- | --- | --- | --- | --- |
| 0 | 1.9 | 1.9 | 1.9 | 1.9 |
| 0.25 | — | — | — | 13.3 |
| 0.5 | — | — | — | 13.6 |
| 3 | — | — | 21.8 | — |
| 4 | — | — | 29.0 | — |
| 5.5 | — | — | 36.1 | — |
| 10 | 2.2 | — | — | — |
| 39 | — | 24.8 | — | — |
| 45 | — | 29.0 | — | — |
| 648 | 40.0 | — | — | — |

Figure 9:
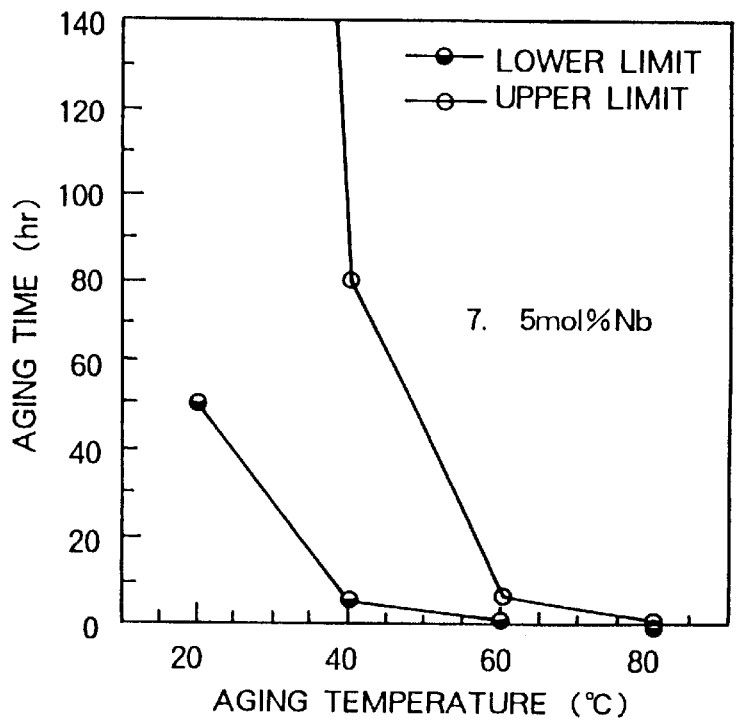
FIG. 9 is a graph showing the relationship between aging temperature and aging time in the test composition 2.

FIG. 9 can be obtained by seeking the upper limit and the lower limit of the aging condition for the test composition 2 from Table 4 and FIG. 8.

Figure 10:
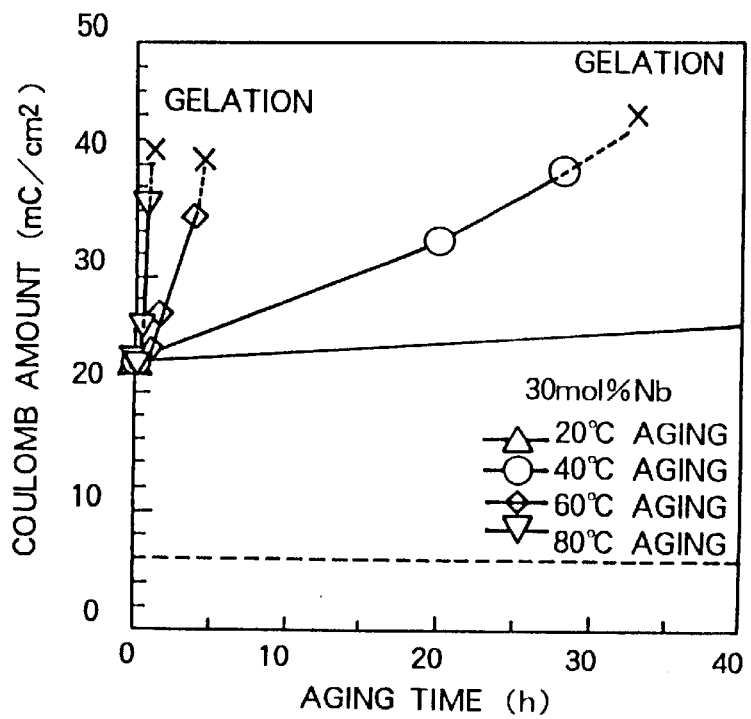
FIG. 10 is a graph showing the relationship between the aging time and the Coulomb amount in the test composition 3.

Results of the test composition 3 are shown in Table 5 and FIG. 10.

TABLE 5

| Aging time | 20° C. | 40° C. | 60° C. | 80° C. |
| --- | --- | --- | --- | --- |
| 0 | 22.6 | 22.6 | 22.6 | 22.6 |
| 0.17 | — | — | — | 22.3 |
| 0.42 | — | — | — | 25.3 |
| 0.7 | — | — | — | 36.2 |
| 1 | — | — | 23.7 | — |
| 1.75 | — | — | 26.6 | — |
| 4 | 23.0 | — | 35.4 | — |
| 20 | — | 33.2 | — | — |
| 28 | — | 39.4 | — | — |
| 400 | 45.0 | — | — | — |

Figure 11:
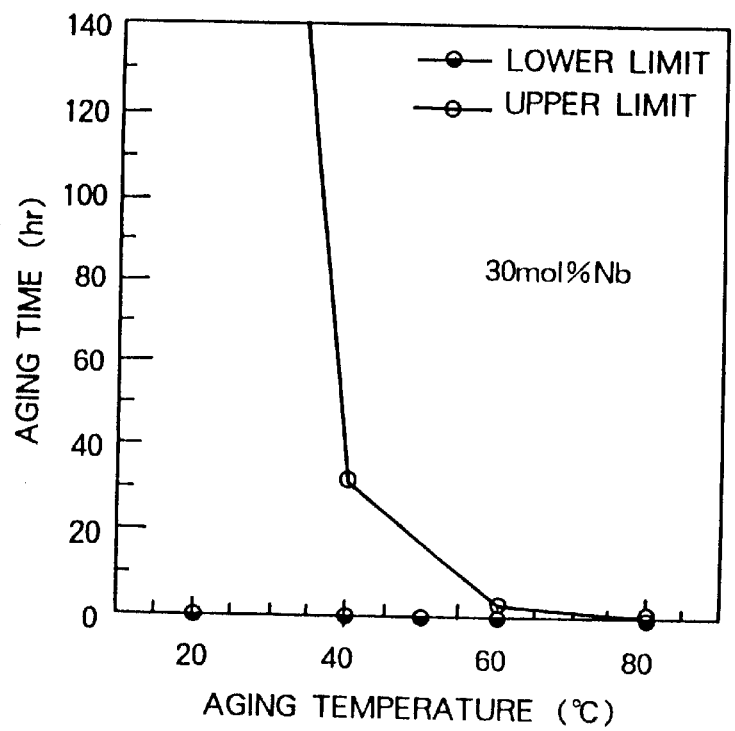
FIG. 11 is a graph showing the relationship between aging temperature and aging time in the test composition 3.

FIG. 11 can be obtained by seeking the upper limit and the lower limit of the aging condition for the test composition 3 from Table 5 and FIG. 10.

Figure 12:
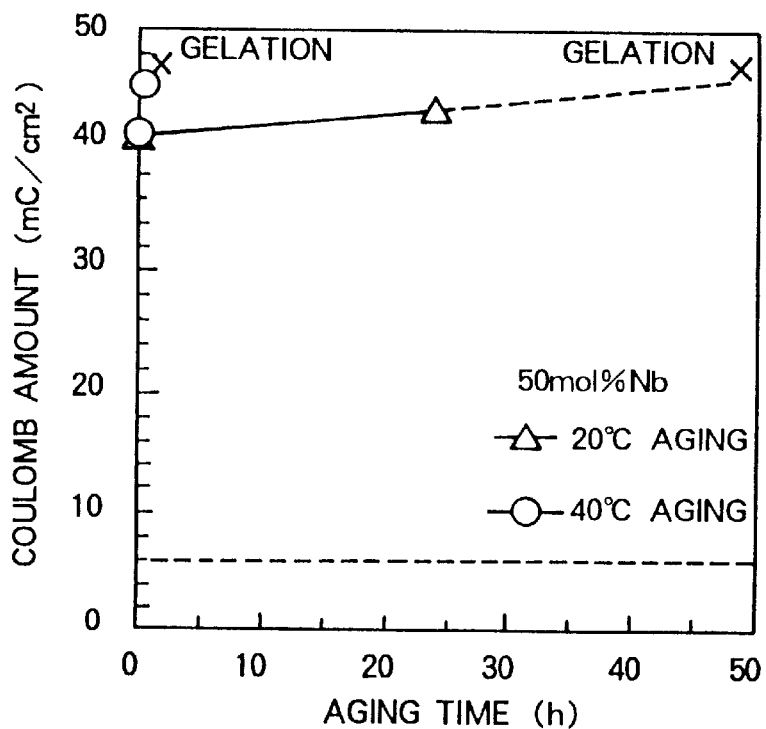
FIG. 12 is a graph showing the relationship between the aging time and the Coulomb amount in the test composition 4.

Results of the test composition 4 are shown in Table 6 and FIG. 12.

TABLE 6

| Aging time | 20° C. | 40° C. | 60° C. | 80° C. |
|---|---|---|---|---|
| 0 | 41.3 | 41.3 | 41.3 | 41.3 |
| 0.5 | — | 45.3 | — | — |
| 24 | 43.4 | — | — | — |

Figure 13:
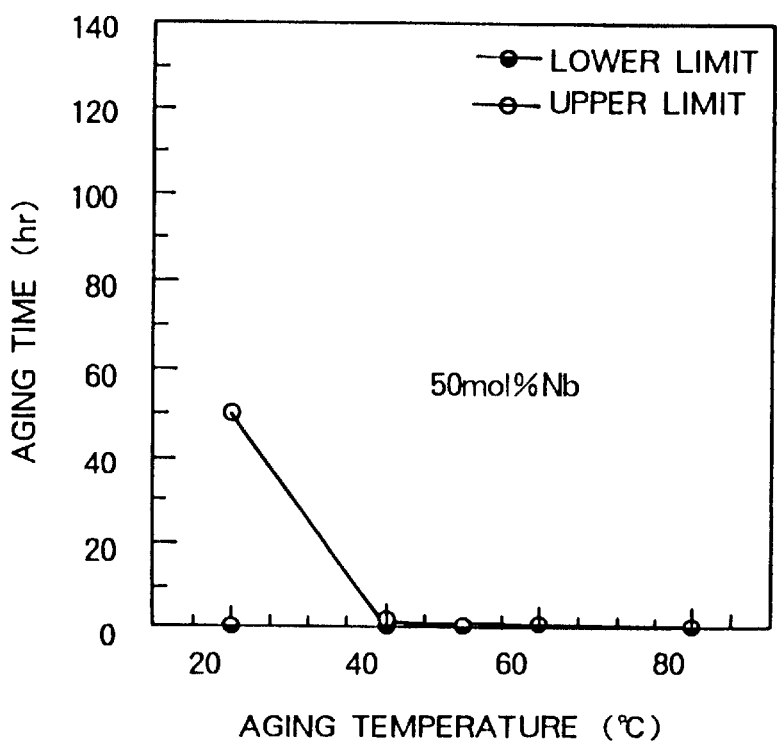
FIG. 13 is a graph showing the relationship between aging temperature and aging time in the test composition 4.

FIG. 13 can be obtained by seeking the upper limit and the lower limit of the aging condition for the test composition 4 from Table 6 and FIG. 12.

Figure 14:
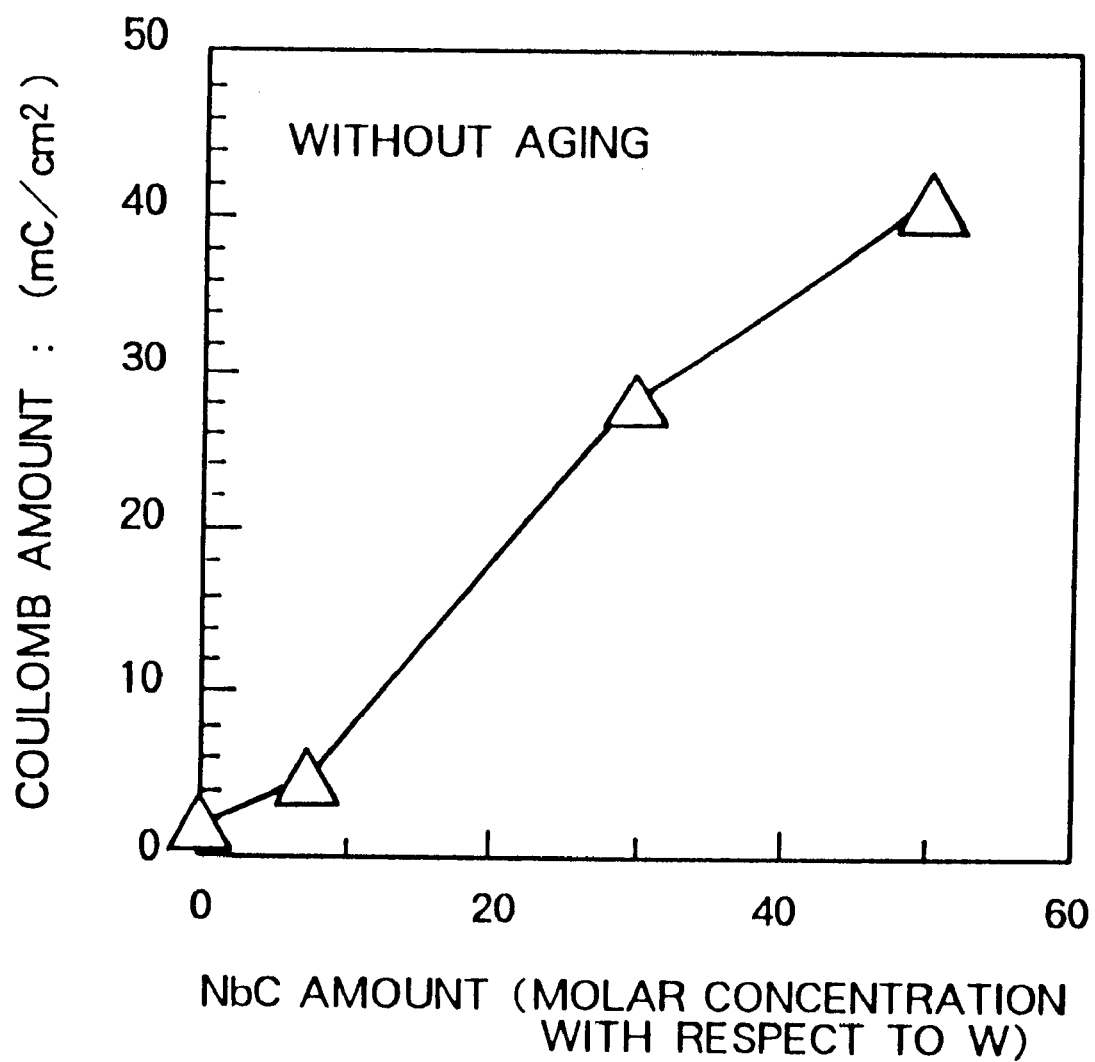
FIG. 14 is a graph showing the relationship between the NbC powder amount and the Coulomb amount.

Further, from Tables 3 to 6, the relationship between the NbC powder amount and the Coulomb amount without aging the test compositions 1 to 4 is shown in FIG. 14.

Accordingly, from FIGS. 7, 9, 11, 13 and 14 it was learned that the preferable aging condition for the peroxotungstic acid solution differs depending on the NbC powder amount so that the desired aging condition can be selected according to the Nb amount contained.

(Test 2)

Figure 15:
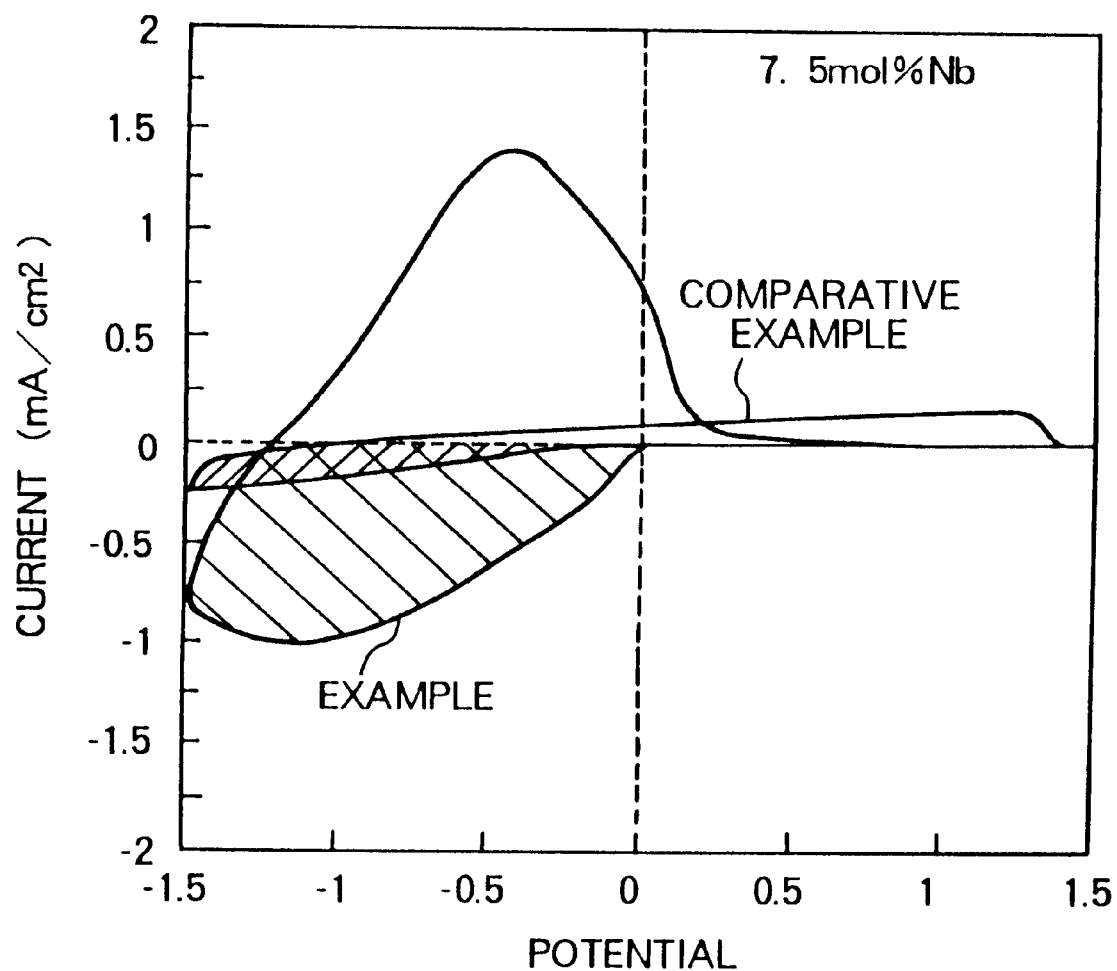
FIG. 15 is a graph showing the relationship between the potential and the current.

The relationship between the potential and the current in the above-mentioned test composition 2 for a comparative example without aging and an example with aging for 17 hours at 50° C. is shown in FIG. 15.

The area of the hatched portion in FIG. 15 is the reduction current amount. From FIG. 15, it can be seen that the reduction current amount of the comparative example is 4.3 mC/cm$^2$ whereas the reduction current amount of the example is 23.5 mC/cm$^2$.

Therefore, it is observed that a sufficient coloring effect can be obtained and the response speed of the coloration-bleaching change can be faster by forming a reduction coloring layer with a polymer obtained by aging a peroxotungstic acid solution.

(Test 3)

The bond state of W was observed with an infrared absorption spectrum analyzer in the above-mentioned test composition 2 for a comparative example without aging and an example with aging for 17 hours at 50° C. Results are shown in FIG. 16.

Figure 16:
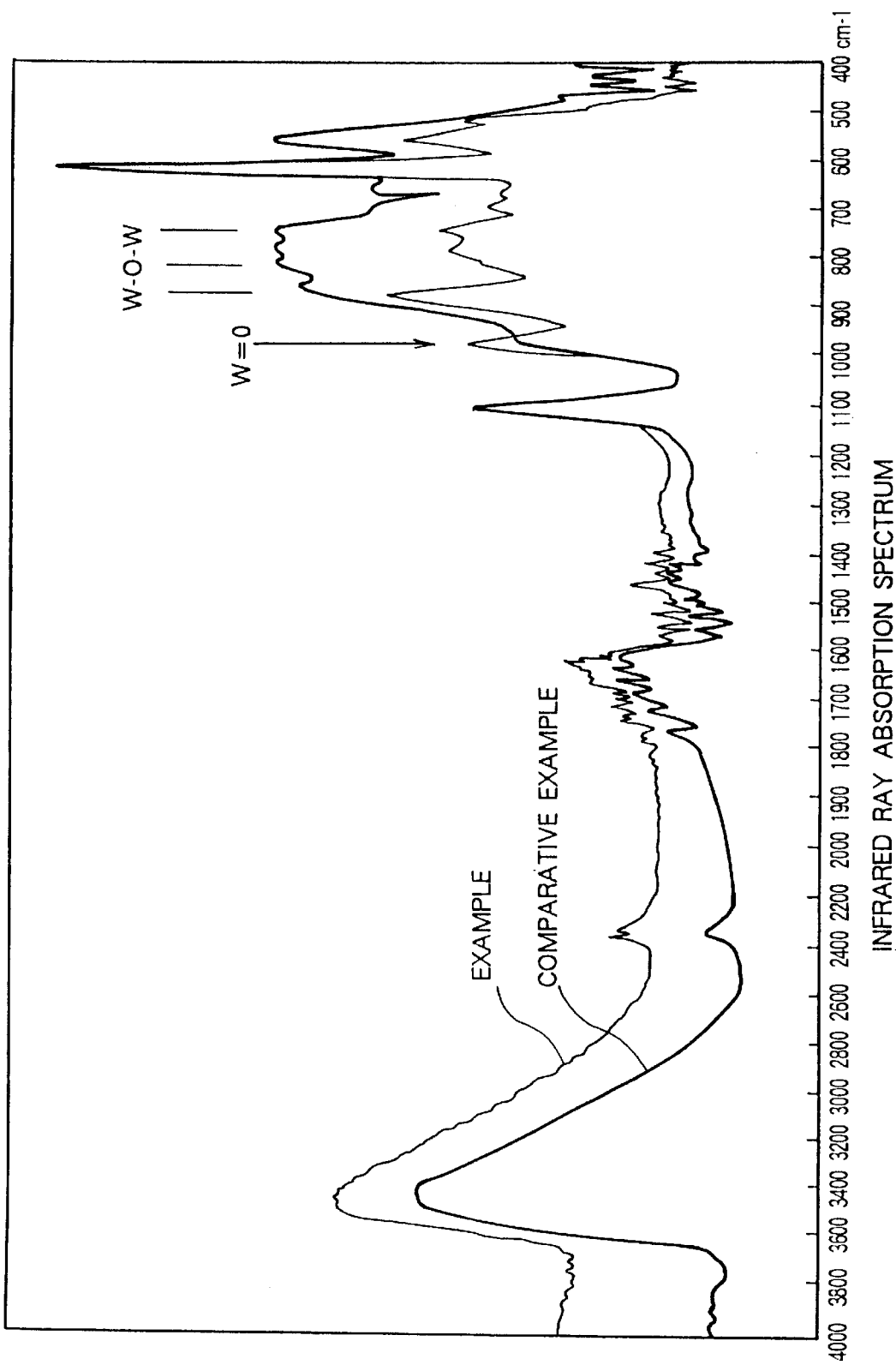
FIG. 16 is a graph showing the infrared absorption spectra indicating the bonding state of W.

From FIG. 16, it can be seen that the peroxotungstic acid solution before aging has a large W=O peak and small molecules, whereas a polymer obtained by aging a peroxotungstic acid solution has a large W-O-W peak and large molecules. Therefore, it is believed that the reduction coloring layer comprising the polymer becomes coarse so that ions having a comparatively large radiuses such as Na ions and K ions can enter or exit easily so as to accelerate the ion diffusion, and thus the results of the test 2 can be obtained.

(Test 4)

The pot life until gelation at 20° C. was sought for the test compositions 1 to 4. Results are shown in FIG. 17.

Figure 17:
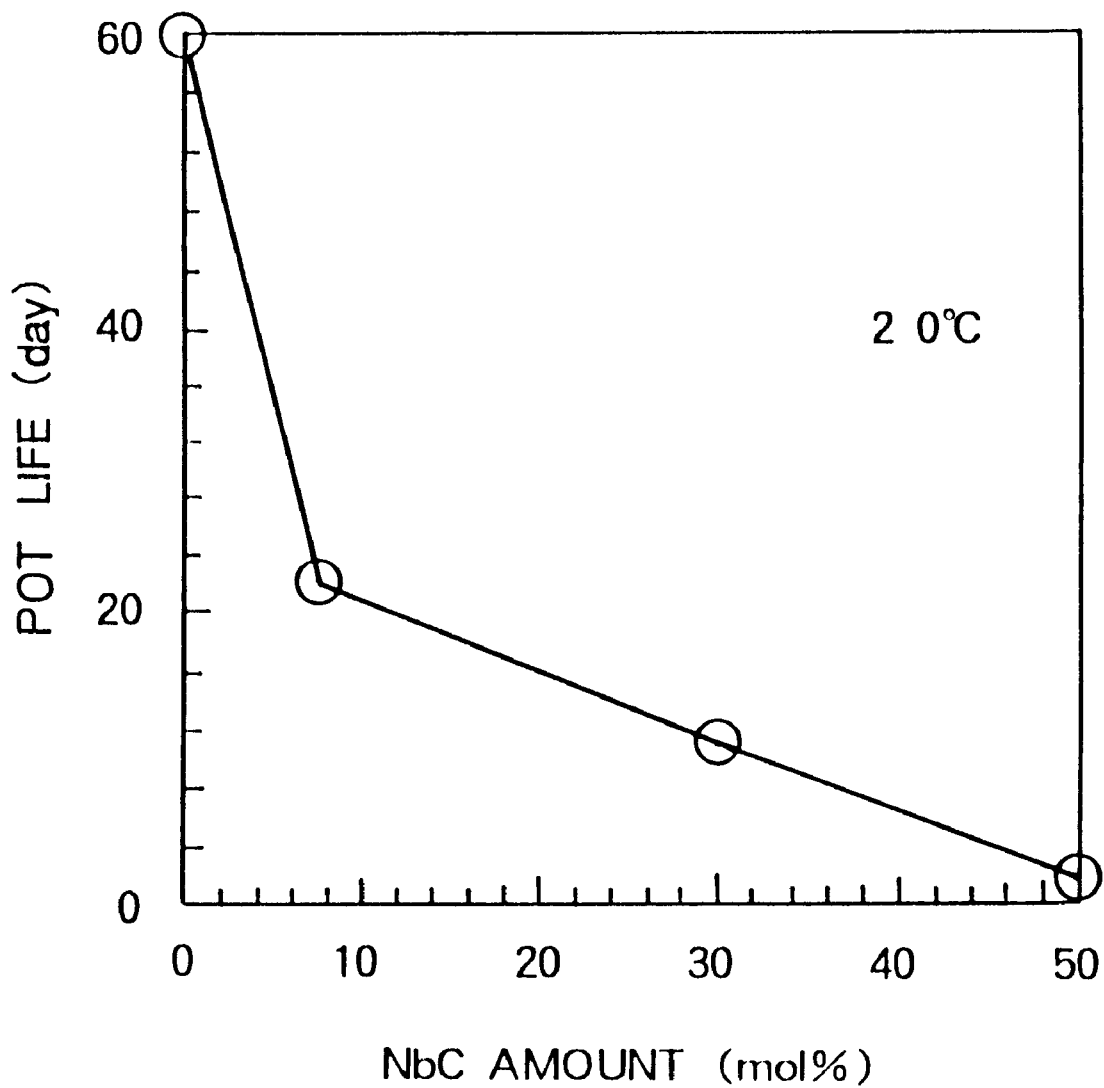
FIG. 17 is a graph showing the relationship between the NbC powder amount and the pot life.

From FIG. 17, it is observed that with a smaller NbC powder amount, polymerization hardly proceeds and the pot life is long.

Therefore, it was confirmed that the pot life can be controlled according to the amount of the NbC powder.

What is claimed is:

1. A method for preparing a coloring layer composition for a chromatic device comprising a step of preparing a peroxotungstic acid solution comprising a solute including WO$_3$●aNb$_2$O$_5$●bH$_2$O$_2$●cH$_2$O (a, b, and c represent a positive number), water for dispersing and holding the solute, and an organic solvent compatible with water, and aging the peroxotungstic acid solution to obtain a polymer.

2. The method according to claim 1, comprising:

a first step of obtaining a first solution by dissolving W powders and NbC powders in H$_2$O$_2$;

a second step of obtaining a second solution by separating C from the first solution;

a third step of obtaining a third solution containing WO$_3$●aNb$_2$O$_5$●bH$_2$O$_2$●cH$_2$O (a, b, and c represent a positive number) by decomposing excessive H$_2$O$_2$ and evaporating excessive water from the second solution; and a fourth step of adding an organic solvent to the third solution.

3. The method according to claim 1, wherein the organic solvent is selected from alcohols having C$_1$ to C$_6$ carbon atoms.

4. The method according to claim 3, wherein the alcohol is propanol.

5. The method according to claim 1, wherein the ratio of the solute : water : organic solvent is, 1 : about 0.1 to 5 : about 0.4 to 20.

6. The method according to claim 1, wherein the aging operation is conducted at a temperature of from about 20° C. to 80° C.

* * * * *

UNITED STATES PATENT AND TRADEMARK OFFICE
CERTIFICATE OF CORRECTION

PATENT NO. : 5,961,891
DATED : October 5, 1999
INVENTOR(S) : Takanori Murasaki et al.

It is certified that error appears in the above-identified patent and that said Letters Patent is hereby corrected as shown below:

Title Page,
Column 1,

[75] Inventors:
Line 3, change "Aichi-ken" to -- Kariya, Aichi --;

[73] Assignee:
Line 2, after "Kariya," insert -- Aichi, --.

Column 4,
Line 43, change "Nbc" to -- NbC --.

Signed and Sealed this

Twenty-first Day of August, 2001

*Attest:*

*Attesting Officer*

NICHOLAS P. GODICI
*Acting Director of the United States Patent and Trademark Office*